(12) United States Patent
Goldstein et al.

(10) Patent No.: US 9,734,208 B1
(45) Date of Patent: Aug. 15, 2017

(54) KNOWLEDGE SHARING BASED ON MEETING INFORMATION

(71) Applicant: Audible, Inc., Newark, NJ (US)

(72) Inventors: Douglas Scott Goldstein, Riverdale, NJ (US); Ajay Arora, New York, NY (US); Nathan Garret Brothers, New York, NY (US); Douglas Cho Hwang, New York, NY (US); Guy Ashley Story, Jr., New York, NY (US)

(73) Assignee: Audible, Inc., Newark, NJ (US)

( * ) Notice: Subject to any disclaimer, the term of this patent is extended or adjusted under 35 U.S.C. 154(b) by 267 days.

(21) Appl. No.: 13/893,215

(22) Filed: May 13, 2013

(51) Int. Cl.
G06F 7/00 (2006.01)
G06F 17/00 (2006.01)
G06F 17/30 (2006.01)

(52) U.S. Cl.
CPC .................. *G06F 17/3053* (2013.01)

(58) Field of Classification Search
None
See application file for complete search history.

(56) References Cited

U.S. PATENT DOCUMENTS

| | | | |
|---|---|---|---|
| 6,185,527 B1 * | 2/2001 | Petkovic | G06F 17/30746 704/231 |
| 7,840,418 B2 * | 11/2010 | Schoenberg | 705/2 |
| 9,386,107 B1 * | 7/2016 | Browning | G06Q 50/01 |
| 2004/0267730 A1 * | 12/2004 | Dumais | G06F 17/30613 |
| 2005/0022252 A1 * | 1/2005 | Shen | 725/135 |
| 2005/0216443 A1 * | 9/2005 | Morton et al. | 707/3 |
| 2006/0093998 A1 * | 5/2006 | Vertegaal | G06F 3/011 434/236 |
| 2006/0116861 A1 * | 6/2006 | Kaplan | G06F 17/2745 704/1 |
| 2007/0016553 A1 * | 1/2007 | Dumais | H04L 12/5885 |
| 2008/0027921 A1 * | 1/2008 | Chandrasekar | G06F 17/3087 |
| 2008/0028036 A1 * | 1/2008 | Slawson | G06F 17/30867 709/217 |
| 2008/0065414 A1 * | 3/2008 | Schoenberg | 705/2 |
| 2009/0043581 A1 * | 2/2009 | Abbott et al. | 704/254 |
| 2009/0089088 A1 * | 4/2009 | Schoenberg | 705/2 |
| 2009/0089098 A1 * | 4/2009 | Schoenberg | 705/3 |
| 2009/0252305 A1 * | 10/2009 | Rohde et al. | 379/88.13 |
| 2009/0313076 A1 * | 12/2009 | Schoenberg | 705/9 |
| 2011/0043652 A1 * | 2/2011 | King et al. | 348/222.1 |
| 2012/0229446 A1 * | 9/2012 | Hyndman | G09B 19/00 345/419 |

* cited by examiner

*Primary Examiner* — Susan Chen
(74) *Attorney, Agent, or Firm* — Knobbe, Martens, Olson & Bear, LLP

(57) ABSTRACT

Features are disclosed for automatically facilitating knowledge sharing using information collected during meetings. Collected information may include both the content and context of a meeting. The meeting content may comprise text collected by automatic speech recognition or entered manually at a user device. The meeting context may comprise information such as the identities of meeting participants and subject matter from a meeting agenda. The content and context information may be used to identify relevant topics for which knowledge is available, and the available knowledge may be presented to one or more of the meeting participants.

19 Claims, 4 Drawing Sheets

TRANSCRIPT

Jack: Thank you for coming. We are here to talk about Project X. By the end of this meeting we should all be ready for launch day.

Jill: Let's start by getting status reports from our PMs in each department.

John: Marketing is working on updating our literature based on the branding guidelines we discussed last week.

Jane: IT is currently installing SP2 on the new servers that we ordered from the vendor.

*322* TOPICS

↑

*402* GOALS OF PROJECT X

Project X is the company's latest scheme to corner the market on widgets and establish ourselves as the preferred supplier of widget-related accessories in all major international markets.

*Widget Market Share*   *Synergy*

The strategy for accomplishing these goals involves synergistic improvements in technology, marketing, and customer service. *404*   *406* [more...]

Launch Day for Project X is June 1. [more...]

Branding Guidelines has a wiki page. [more...]

The Vendor here is Big Data, Inc.

*Fig. 4*

KNOWLEDGE SHARING BASED ON MEETING INFORMATION

BACKGROUND

Many organizations, including businesses, government agencies, and non-profit institutions, are constantly accumulating information related to their activities. Common sources of information may include, for example, emails, intranet pages, memoranda, work product, manuals, and the like. Useful knowledge may be revealed from this information both implicitly (e.g., by patterns in the information) and explicitly (e.g., by a document that summarizes a particular activity of an organization).

Sharing knowledge between individuals within an organization may provide a variety of benefits, including increased efficiency and improved decision making. Accordingly, many organizations devote substantial resources to collecting and managing information of all sorts. Even when substantial and consistent effort is expended to distill and organize knowledge from a large volume of information, e.g., by producing a comprehensive operations manual, the effort required to access the knowledge may prevent many people from taking advantage of it. Of course, many organizations do not maintain any comprehensive repositories of knowledge whatsoever, and in these organizations the benefits of knowledge sharing are even more limited.

Several elements may be required to make use of shared knowledge, and increasing the efficiency of any or all of these elements may increase the benefits derived from such knowledge. Elements may include, for example, (1) considering the possibility that shared knowledge exists when faced with a particular problem; (2) identifying a source of such knowledge; and (3) finding the desired knowledge within the source.

Ideally, knowledge will be provided at the moment it is needed. If knowledge is provided too early, its usefulness may not be apparent or it may be forgotten before it can be used. If knowledge is provided too late, the need itself may be forgotten and more effort may be required to use the knowledge. Making access to shared knowledge more efficient also makes it easier to provide knowledge at the moment it is most useful.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 4 is a user interface diagram of an illustrative user device for presenting shared knowledge based on meeting information.

DETAILED DESCRIPTION

Introduction

Generally described, the present disclosure relates to facilitating knowledge sharing within an organization. Aspects of the present disclosure relate to automatically determining when shared knowledge relevant to an ongoing meeting is available and presenting such knowledge to meeting participants while it is relevant. For example, if several individuals are participating in a meeting, a knowledge sharing system may use automatic speech recognition (ASR) to generate a transcript of any discussion that occurs. Relevant topics may be identified from the transcript, and shared knowledge related to the identified topics may be presented to one or more of the participants. Both the topics identified and the knowledge presented may depend on information obtained from the meeting, including, e.g., the identities of the participants, the purpose of the meeting, and the content of the discussion. By minimizing the effort required to obtain shared knowledge at relevant moments during the course of a meeting, features disclosed herein may facilitate efficient and competent action by individuals within an organization.

Although aspects of the embodiments described in this disclosure will focus, for the purpose of illustration, on features provided by a central knowledge sharing system and various user devices, one skilled in the art will appreciate that the techniques disclosed herein may be applied to any number of software processes or applications, implemented on any number of different hardware devices. In addition, the term "meeting," as used herein, is a broad term and includes, without limitation, seminars, speeches, informal discussions, and conversations. Further, although various aspects of the disclosure will be described with regard to illustrative examples and embodiments, one skilled in the art will appreciate that the disclosed embodiments and examples should not be construed as limiting. Various aspects of the disclosure will now be described with regard to certain examples and embodiments, which are intended to illustrate but not limit the disclosure.

Knowledge Sharing Environment

Figure 1:
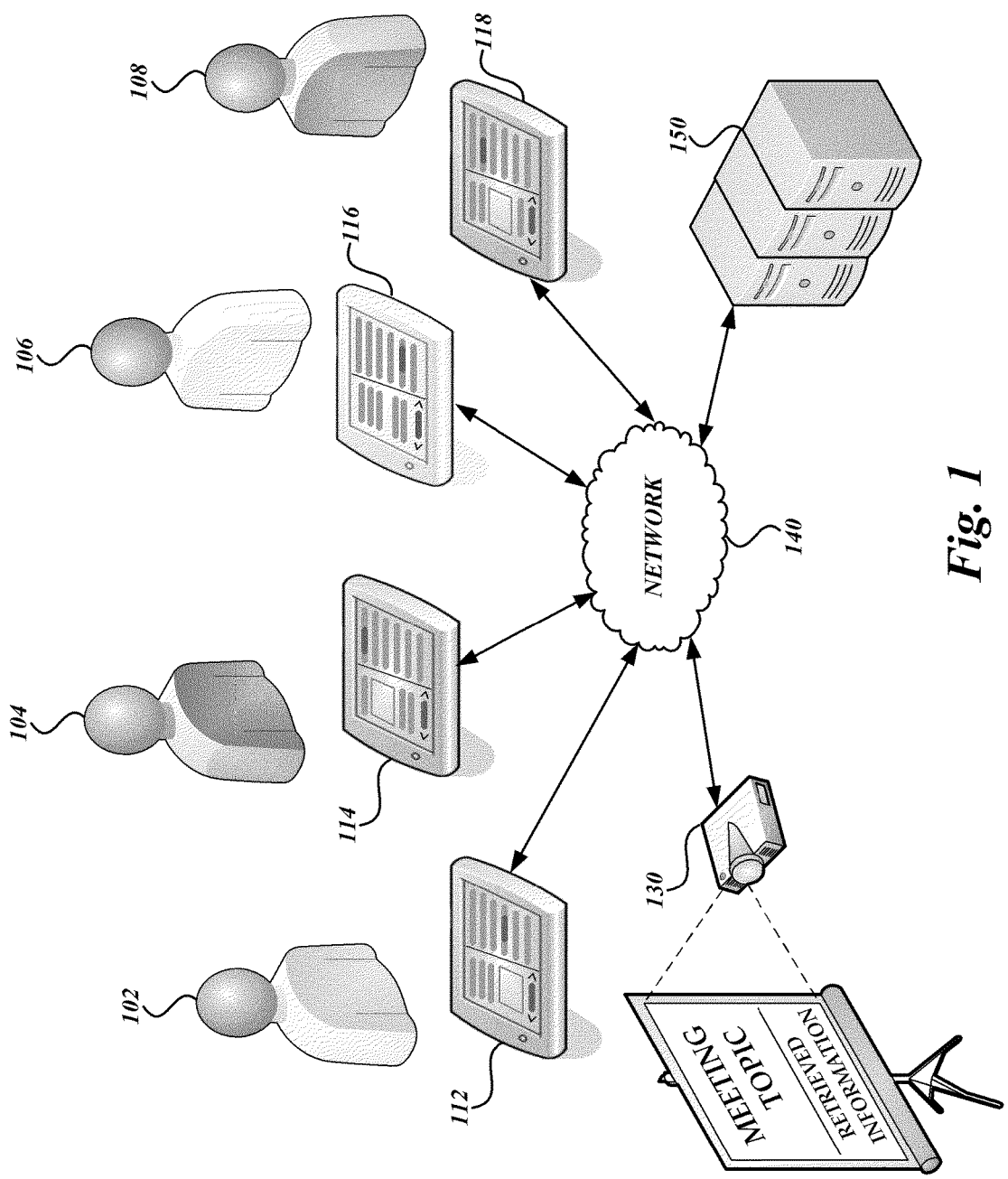
FIG. 1 is a block diagram of an illustrative knowledge sharing environment including several devices for sharing knowledge based on information associated with a meeting.

Prior to describing embodiments of the knowledge sharing systems and methods in detail, an example knowledge sharing environment in which the systems and methods may be implemented will be described. FIG. 1 illustrates a knowledge sharing environment including servers 150 and various user devices 112-118 communicating over a communication network 140. The communication network 140 may be any wired network, wireless network, or combination thereof. In addition, the network 140 may be a personal area network, local area network, wide area network, cable network, satellite network, cellular telephone network, or combination thereof. For example, the communication network 140 may be a publicly accessible network of linked networks, possibly operated by various distinct parties, such as the Internet. In some embodiments, the communication network 140 may be a private or semi-private network, such as a corporate or university intranet. The communication network 140 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The user devices 112-118 can correspond to a wide variety of electronic devices. In some embodiments, one or more user devices 112-118 are computing devices that include one or more processors and a memory which may contain software applications executed by the processors. User devices 112-118 may include displays for presenting information and microphones for capturing audio. In addition, the user devices 112-118 may be configured with one or more wireless network antennae or wired ports to facilitate communication with other devices and with the knowledge sharing servers 150. The software of the user devices 112-118 may include components for establishing communications over the communication network 140. In addition, the software may include knowledge sharing applications which capture meeting audio for processing by an ASR engine, present transcripts generated from the audio, and provide information on topics discussed in the meeting. In certain embodiments, some or all of the user devices will receive text input, in addition to or instead of audio input, e.g., via a physical or virtual keyboard. Manually entered text may be combined with automatically generated text from ASR to produce a unified transcript.

The user devices may include tablet computers, laptop computers, mobile phones, electronic book readers, personal audio players, personal digital assistants, and the like. The user devices may also be built specifically for knowledge sharing. Different user devices in the same knowledge sharing environment may include different hardware and software. In some embodiments, multiple user devices may be integrated into a single physical unit. For example, the user devices may comprise several screens and microphones built into a conference room table, all of which may be connected to a single computing device. In other embodiments, multiple user devices may be located remotely from one another.

In addition to devices for individual users, such as user devices 112-118, the knowledge sharing environment may include devices for group use, such as group device 130. While user devices 112-118 may present knowledge that is relevant to any individual meeting participant, group device 130 may only present knowledge that is likely to be relevant to multiple participants. In some embodiments, multiple group devices many be provided to accommodate different participant groups, particularly in meetings with large numbers of participants. For example, one group device may be configured for use by members of a marketing department, and another group device may be configured for use by members of an engineering department. When multiple group devices are used, the knowledge presented on each device may vary depending on what is deemed relevant to each participant group.

In general, group device 130 may comprise hardware and software similar to user devices 112-118, although various aspects may be modified to support shared use by multiple individuals. For example, group device 130 may comprise a larger display area, additional microphones, etc. Although group device 130 is depicted as a projector in FIG. 1, any suitable display may be used. In addition to a display, group device 130 may include additional hardware to perform computation and other functions similar to those of user devices 112-118.

The knowledge sharing servers 150 illustrated in FIG. 1 may correspond to one or more computing devices configured to facilitate automated knowledge sharing via the user devices 112-118 and/or group device 130. For example, the servers 150 may include one or more processors and a computer storage or memory which contains software applications or modules executed by the processors. The functionality provided by the servers 150 can include receiving audio data from the user devices, performing ASR on the audio to generate a meeting transcript, identifying topics from the transcript, and providing access to shared knowledge related to the identified topics. In some embodiments, the servers 150 may correspond to a logical association of one or more computing devices, such as an ASR server for recognizing speech, a database server for storing information about available knowledge, and an application server for managing interactions with the user devices. In some embodiments, the features and services provided by the servers may be implemented as web services consumable via the communication network 120. In further embodiments, the shared consumption management system 102 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the knowledge sharing environment may include additional or fewer components than those illustrated in FIG. 1. For example, the networked content consumption environment may not include separate servers 150. Rather, the features of the servers 150 may be implemented by one or more of the user devices. In another example, a load balancer may be included to allocate computing tasks among the servers 150.

Figure 2:
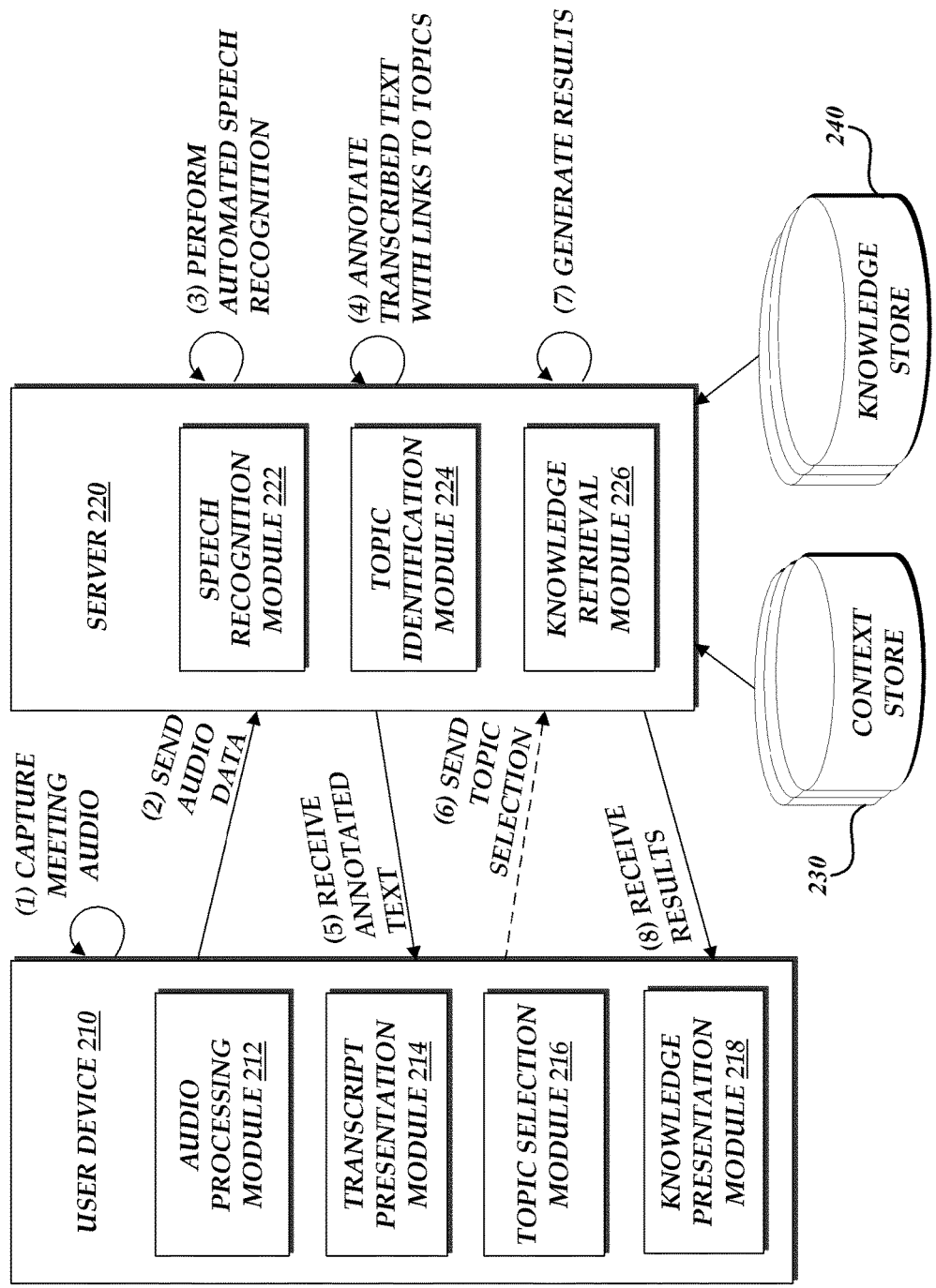
FIG. 2 is a block diagram of an illustrative system for sharing knowledge based on meeting information.

Turning now to FIG. 2, an illustrative knowledge sharing system will be described. The knowledge sharing system of FIG. 2 may comprise a user device 210, which may correspond to one of the user devices 112-118 of FIG. 1, and a server 220, which may correspond to one of the servers 150 of FIG. 1. The user computing device 210 and server 220 may each be embodied in a plurality of components, each executing an instance of the respective user computing device 210 and server 220. Each of the user computing device 210 and the server 220 may include a network interface, memory, processing unit, and non-transitory computer-readable medium drive, all of which may communicate with each other by way of a communication bus. Moreover, a processing unit may itself be referred to as a computing device. The network interface may provide connectivity over the network 140 and/or other networks or computer systems. The processing unit may communicate to and from memory containing program instructions that the processing unit executes in order to operate the user computing device 210 and server 220. The memory generally includes RAM, ROM, and/or other persistent and/or auxiliary non-transitory computer-readable storage media.

As illustrated in FIG. 2, the user device 210 may execute an audio processing module 212, a transcript presentation module 204, a topic selection module 206, and a knowledge presentation module 218, each of which may be stored in memory of the user device 210. The server 220 may execute a speech recognition module 222, a topic identification module 224, and a knowledge retrieval module 226, each of which may be stored in memory of the server 220. As described earlier with respect to the corresponding devices of FIG. 1, the functionality of the user device 210 and the server 220 may be rearranged. For example, speech recognition module 222 may be implemented on user device 210 rather than server 220.

In addition to various modules of user device 210 and server 220, the knowledge sharing system of FIG. 2 also includes context store 230 and knowledge store 240, both of which may comprise multiple data stores with varying structure and content. Context store 230 and knowledge store 240 may be remote from the server 220. Additionally, the knowledge sharing system may include additional or fewer modules and/or data stores than those illustrated in FIG. 2.

Knowledge store 240 may comprise various primary sources from which knowledge may be obtained, such as document management systems, email repositories, wikis, project management databases, operations manuals, dictionaries, glossaries, etc. In addition, knowledge store 240 may comprise reference sources for organizing, summarizing, or structuring the contents of the primary sources. For example, reference sources may comprise search indexes, lists of topics, and document clusters, any or all of which may be automatically generated from the primary sources.

Context store 230 may comprise information that can be used to facilitate automated knowledge sharing based on the context of a meeting. As described below, context information may be used to improve accuracy and relevance in various parts of the knowledge sharing system. Context store 230 may include specific information about the circumstances of a meeting, such as the identities of meeting participants, the date and time of the meeting, or the meeting agenda. In addition, context store 230 may include supplemental information related to the specific circumstances, such as job titles, responsibilities, documents previously distributed, and recent emails of the meeting participants. This supplemental information may overlap with the contents of knowledge store 240, but may be used differently. For example, supplemental information in the form of one or more emails may be used to determine which meeting participants are already familiar with a particular topic. Knowledge regarding the particular topic may then be shared only with participants who are not yet familiar with it.

Example interactions between the various components of the knowledge sharing system will now be described. As noted above, the knowledge sharing system may be used to transcribe a discussion that occurs between several participants during a meeting. Accordingly, user device 210 may be configured to capture audio when a participant speaks. The captured audio signal may be used for ASR, as described below. If multiple user devices are present in a meeting, each device may be configured to only capture audio corresponding to the speech of a particular participant or subset of participants. For example, if each participant has a separate device, then the device belonging to each participant may capture audio for that participant only. Alternatively, all of the devices may capture audio for all of the participants, and audio data from multiple devices may be combined to produce better ASR results. If multiple audio signals are provided by devices in different locations relative to a particular speaker, the accuracy of ASR results produced from the audio signals may be improved by selecting the single device with the best audio quality for a particular portion of an utterance, or by determining the most likely content of the utterance in light of the combination of captured audio signals.

Audio processing module 212 may receive an audio signal captured by user device 210 and extract data for use in ASR. An ASR process may include several "front-end" elements, such as speech detection and feature extraction. Any or all of these elements may be performed by audio processing module 212. Alternatively, some or all of these elements may be performed by speech recognition module 222 of server 220. If the audio processing module performs the feature extraction, the audio data transmitted to server 220 may include feature vectors, which measure certain aspects of an audio signal that are useful for ASR. If the feature extraction is performed by the speech recognition module instead, then the transmitted audio data may comprise a digital audio stream.

The audio data, whether it comprises feature vectors, an audio stream, or other data, is sent by audio processing module 212 to speech recognition module 222. The speech recognition module performs ASR using the audio data, producing a transcript of any words spoken by meeting participants. Speech recognition module 222 may also identify different speakers, and label the transcript to specify which participant spoke which words. In some embodiments, the identity of a particular speaker may be provided by user device 210, and transmitted to speech recognition module 222 along with the audio data. As speech is transcribed, the resulting text is provided to topic identification module 224.

Topic identification module 224 identifies topics for which shared knowledge is available based on the transcribed text, and information from context store 230. Annotations may be added to the transcript to indicate the availability of shared knowledge on a particular topic. For example, words in the transcript that describe a relevant topic may be underlined, highlighted, or otherwise set apart. Alternatively, if a topic is identified as relevant but the words in the transcript do not appropriately describe it, an annotation may be added between lines of the transcript or in a margin. Although topic identification module 224 may distinguish between multiple types of annotations, such as inline and marginal, the manner in which such annotations are actually presented may be determined by transcript presentation module 214, described below. Accordingly, when the annotated transcript is constructed and transmitted, the annotations therein may be represented semantically rather than visually, e.g., using Extensible Markup Language (XML).

Meeting topics may be identified from a transcript in a variety of ways. In some embodiments, topic identification may be fully automatic, while in other embodiments there may be some manual involvement. In the case of manual involvement, a user may prepare a list of topics, keywords, or other metadata, and embed this metadata in an agenda, presentation, or other form of meeting materials made available to topic identification module 224. For example, a user may provide a list of topics in the "Notes" section of one or more slides in a Microsoft PowerPoint presentation, and as each slide is presented at a meeting, the topics listed in the slide's "Notes" section may be annotated in the meeting transcript. Specific topics may also be provided by input to a user device, which may transmit the topic directly to topic identification module 224, or to knowledge retrieval module 226 (described below).

In the case of automated topic identification, the transcript may be analyzed to identify one or more relevant attributes, and the identified attributes may be used to search for available topics. The topic search may also rely on information from context store 230, as noted above. In one example, a list of available topics may be provided by knowledge store 240. An index may be provided as well, to associate one or more keywords with each available topic from the list. Both the list and the index may be updated regularly based on new information generated by the organization. During a meeting, words from the transcript may be compared with keywords from the index to identify potentially relevant topics from the list. These potentially relevant topics may be filtered based on information from context store 230, to determine which topics will actually be annotated in the transcript.

In the foregoing example, the attributes identified from the transcript are the words of the transcript themselves. In some embodiments, however, more complex attributes may be used. Complex attributes may be calculated, looked up, or otherwise determined from the words of the transcript in any number of ways. Specifically, attributes may include any text, number, or other data value that is likely to be correlated with the relevance of particular topics. In addition, while the foregoing example contemplated the use of context information to filter potentially relevant topics after they are identified from a set of attributes, context information may also be incorporated into the attributes themselves and used to identify topics from an index directly.

In some embodiments, different topics may be identified and annotated for different users. The specific topics that are identified and annotated for a particular user may be based on, e.g., context information about the user or other meeting participants, or a set of security permissions. For example, topic identification module 224 may determine that a certain topic is more or less relevant for a particular user based on the supplemental information from context store 230, described above. The supplemental information may include emails from the user indicating that the user is already familiar with available knowledge on a particular topic, in which case the topic may not be annotated in a transcript transmitted to the user's device.

Topics may also be identified and annotated on the basis of context information about meeting participants other than the particular user to whom the topics are presented. For example, if a meeting is being led by a member of an engineering team, technical topics may be assigned a higher relevance for some or all meeting participants. Alternatively, if a meeting is being led by a high-level executive, topics related to business strategy may be assigned a higher relevance. As described below, the factors that influence topic identification may also influence the knowledge results that are produced when a topic is selected.

With respect to security permissions, certain users may be prevented from accessing knowledge related to certain topics, e.g., because the knowledge is derived from sources that the user is does not have permission to view. Security permissions may be specified manually for certain types of sources and automatically for others. For example, all users within an organization may have access to knowledge derived from wiki pages, but knowledge derived from emails may be more tightly controlled by security rules that are based on each email's original recipients.

As topics are identified for a particular portion of the transcript, topic identification module 224 may transmit the resulting annotated transcript portion to user device 210. At the user device, topic selection module 216 may receive the annotated transcript portion and present it to a user. Example user interfaces for presenting annotated transcripts are described below with respect to FIGS. 3 and 4. Interfaces like these may be presented by topic selection module 216, and used to receive input specifying a topic of interest. The resulting topic selection may be transmitted back to server 220, and received by knowledge retrieval module 226.

Knowledge retrieval module 226 may generate knowledge results for a selected topic. These results may comprise, e.g., a summary, digest, or other collection of knowledge relating to the selected topic, based on data retrieved from knowledge store 240. In some embodiments, knowledge results for a particular topic may include references to related topics. Knowledge retrieval module may also generate results for topics that are selected automatically, without user input. Automatic topic selection may be based on, for example, estimated relevance of selected topics to one or more users.

The knowledge results generated by knowledge retrieval module 226 may comprise information excerpted from one or more primary sources within knowledge store 240. These excerpts may be harmonized to varying degrees. For example, excerpts from multiple sources may be automatically integrated into a coherent whole, e.g., comprising substantially continuous prose. Alternatively, a single primary source may contain an excerpt suitable for presentation by itself, such as a wiki page. Excerpts may also be combined into a list, with separate entries for each excerpt. Knowledge results for different topics may use different approaches for selecting and combining source information. With any approach, the excerpts from the primary sources may include information in various mediums, such as text, images, videos, etc.

Knowledge results for some or all available topics may be partially or completely generated ahead of time. For example, a summary of the knowledge available for a particular topic may be generated and stored in completed form in knowledge store 240. Then, if the topic is selected, whether automatically or by a user, knowledge retrieval module 226 may provide a result for the topic simply by accessing the pre-generated summary. As an example of partially pre-generated results, knowledge store 240 may store associations that link a particular topic with relevant excerpts from primary sources. Then, if the topic is selected, knowledge retrieval module 226 may generate a result by listing the linked excerpts along with the corresponding primary sources.

Knowledge results, much like the topic annotations, may vary between users. Specifically, certain information may be included or excluded when a knowledge result is generated based on security permissions associated with the underlying sources, or with particular topics. In addition, knowledge results on the same topic may vary between users depending on what each user is likely to be familiar with and what each user is likely to be interested in, as determined from information in context store 230.

As results are generated, they may be transmitted to user device 210. The results may be received by knowledge presentation module 218, and presented to one or more users. Example interfaces for such presentation are described below with respect to FIGS. 3 and 4.

As described previously, both topic identification module 224 and knowledge retrieval module 226 may rely on topic lists, indexes, and other reference sources. These reference sources may allow server 220 to identify relevant topics and retrieve relevant knowledge in real time as a meeting transcript is generated. Reference sources may be generated and updated in accordance with a wide variety of techniques, many of which are known to person skilled in the art of natural language processing. Relevant techniques may include topic segmentation, automatic summarization, named entity recognition, and terminology extraction.

In one example, pages on an organizational intranet may include titles that are explicitly designated as such, e.g., according to a database or XML schema. The knowledge sharing system may compile a topic list in part by creating topics for each of the titles. The system may also identify key words from each intranet page, e.g., based on the frequency with which they occur. The identified key words may be stored in an index and associated with the topic that corresponds to the page. These key words may be used to identify topics in a meeting transcript, as described earlier in this disclosure.

Lists, indexes, and other reference sources may need to be updated as information is generated or modified. Therefore, in some embodiments, the knowledge sharing system may maintain a database of dependencies between reference sources and primary sources, or portions thereof. When information in a primary source is modified, any reference sources that depend on that primary source may be updated accordingly.

Meeting transcripts themselves may constitute an important source of knowledge and context. Accordingly, information from meeting transcripts may be included in context store 230 or knowledge store 240. In particular, context store 230 may include the transcript of a meeting that is underway, and the text in the transcript may be used to improve topic identification, automated topic selection, and knowledge retrieval as the meeting goes on. For example, at the beginning of the topic identification module 224 may lack sufficient information to definitively identify certain topics that are being discussed. As the meeting transcript grows, however, more context may be available and additional topics may be identified.

Meeting transcripts are also a source of knowledge. Accordingly, transcripts of past meetings may be included in knowledge store 240. In some situations, meeting transcripts may not be stored permanently (e.g., because they contain sensitive information), but may be used to improve existing reference sources. For example, a meeting transcript may be used to identify associations between related topics, and these associations may be added to a table in knowledge store 240 before the meeting transcript is deleted. Of course, meeting transcripts may also be used to improve reference sources even if they are also stored in full-text form.

Interfaces for Transcript Presentation, Topic Selection, and Knowledge Presentation As explained above, user device 210 of FIG. 2 may present transcripts, receive topic selections from a user, and present knowledge results for selected topics. User interface 300, illustrated in FIGS. 3 and 4, supports each of these operations, as described below. User interface 300 may be implemented e.g., as a web application or native application on user devices 112-118 of FIG. 1.

Figure 3:
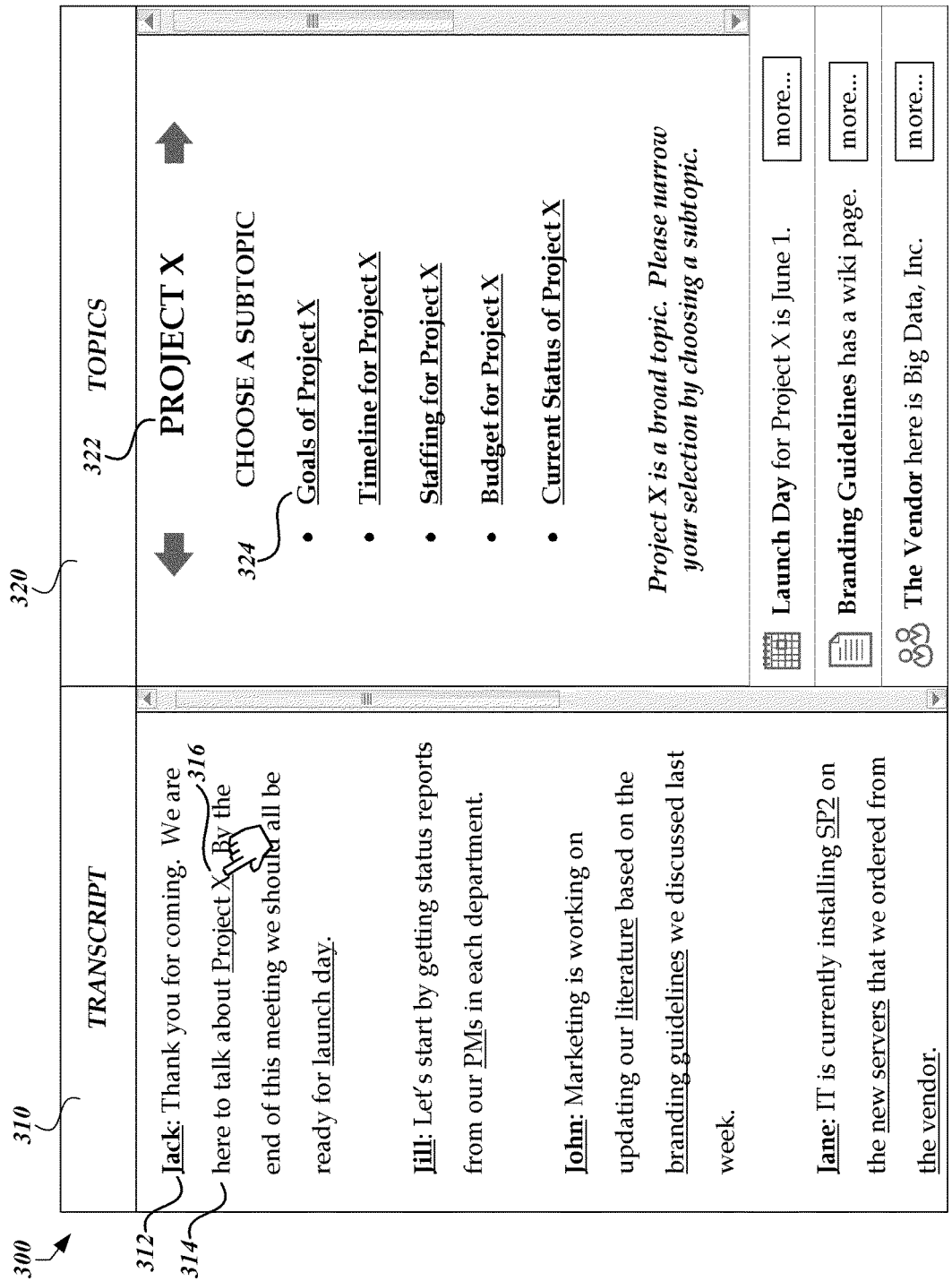
FIG. 3 is a user interface diagram of an illustrative user device providing sub-topic selection for knowledge sharing based on meeting information.

With reference to FIG. 3, user interface 300 may include transcript panel 310 and topic panel 320. Transcript panel 310 may display an annotated transcript received from server 220. As successive portions of the annotated transcript are received, older portions may scroll out of view automatically to make room for newer ones. In some embodiments, user interface 300 may include a button or other input means to temporarily pause the automatic scrolling. User interface 300 may also be configured to pause automatic scrolling when input is predicted in transcript panel 310, e.g., based on movements of a mouse cursor within the panel.

The annotated transcript displayed in transcript panel 310 may include words 314 associated with a particular meeting participant. The words may be labeled with an identifier of the participant who spoke or wrote the words, such as name 312. The identifier may also comprise, e.g., initials, a portrait, or a graphical avatar. The annotated transcript may also include annotations associated with particular topics, such as annotation 316. Annotations may be presented in various ways, in order to draw a user's attention and invite input such as a finger tap or mouse click. For example, words corresponding to a topic may be underlined, highlighted, or otherwise emphasized. Input directed by a user to a particular annotation may be interpreted as a selection of the corresponding topic.

When a user selects a topic displayed in transcript panel 310, knowledge results corresponding to the topic may be displayed in topic panel 320. Words identifying the topic and/or the knowledge results may be provided in header 322, and the knowledge results themselves may appear below. If the topic is broad or ambiguous, however, it may be associated with several subtopics or possible meanings. Accordingly, a menu may be provided to allow the user to select one of the subtopics or possible meanings, in order to narrow the scope of the knowledge results before they are presented. Thus, for example, when the user selects the topic "Project X" by clicking annotation 316, the topic name may be provided in header 322 and the subtopics of Project X may be listed in menu 324. The results of selecting one of the subtopics from menu 324 are depicted in FIG. 4.

As shown in FIG. 4, if the user selects a subtopic from menu 324, heading 322 may be updated to display the name of the subtopic. In addition, knowledge results associated with the selected subtopic may be displayed below the heading. For example, if the subtopic "Goals of Project X" is selected, heading 322 may be updated as shown in FIG. 4, and knowledge results 402 may be presented.

As described previously with respect to FIG. 2, some topics may be selected automatically, without specific input from a user. In certain embodiments, knowledge results for automatically selected topics will be presented in the same manner as knowledge results for user-selected topics. For example, knowledge results for an automatically selected topic may be presented immediately below heading 322 in topic panel 320 of FIGS. 3 and 4. Alternatively, some or all automatically selected topics may be presented in a different manner.

In some embodiments, a knowledge result for an automatically selected topic may be presented compactly in notification box 404. Such compact presentation may allow knowledge results for an automatically selected topic to be presented with less risk of annoyance to the user, e.g., because knowledge results for incorrectly selected topics may be less conspicuous, and may be less likely to interfere with a user's reading of knowledge results for a manually selected topic. For added convenience, notification box 404 may be configured to disappear automatically after a specific period of time unless input is detected therein. If the user is interested in obtaining more information about an automatically selected topic, button 406 may be used to display detailed knowledge results in the area below heading 322.

Whether knowledge results are displayed in notification box 404 or elsewhere, the timing of automatic topic selection may be configured to avoid interfering with the presentation of knowledge results for manually selected topics. For example, automatic topic selection may be avoided when a user has recently made a manual selection, or input collected at the user device (e.g., scrolling) suggests that the user is currently reviewing knowledge results for a manually selected topic. In some embodiments, manually selected topics may be presented in the style of notification box 404, particularly if the knowledge results for the selected topic are concise.

Although the foregoing disclosure describes a system in which meeting transcripts are generated and displayed on various devices, some embodiments may not include such transcripts. For example, rather than providing a full annotated transcript to a user device, some embodiments may simply provide a list of topics that are identified from a meeting discussion. A topic list may scroll automatically, like an annotated transcript, so that new topics are visible as they are added to the list. Using a topic list in place of an annotated transcript may be advantageous for user devices with small screens, such as mobile phones. In addition, some interfaces may support both annotated transcripts and topic lists. For example, a transcript may be hidden or minimized when knowledge results are displayed, in order to provide additional screen space for viewing the knowledge results. A topic list may be provided when the transcript is hidden so that new topics can continue to be displayed.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm elements described in connection with the embodiments disclosed herein can be implemented as electronic hardware, computer software, or combinations of both. To clearly illustrate this interchangeability of hardware and software, various illustrative components, blocks, modules, elements and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The elements of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
a first physical data store that stores context information associated with a meeting of meeting participants;
a second physical data store that stores an index of topics for the meeting; and a server in communication with the first physical data store and the second physical data store, the server including one or more hardware processors that execute computer-executable instructions to:
receive, from a user device, captured audio data corresponding to speech of a spoken dialogue involving two or more meeting participants;
perform automatic speech recognition to generate a transcript of the speech of the spoken dialogue involving the two or more meeting participants from the captured audio data, the transcript comprising a plurality of words;
compare at least some of the plurality of words with keywords in the index of topics stored in the second physical data store to identify candidate topics from the index;
filter, using context information associated with the meeting and stored in the first physical data store, the candidate topics to identify a first topic and a second topic relevant to the meeting from the candidate topics;
generate, from the transcript, an annotated transcript with a first embedded indication of the first topic and a second embedded indication of the second topic, wherein the first embedded indication is configured for presentation as a textual representation of the first topic, the textual representation different from a visual representation of another portion of the annotated transcript;

send, to the user device, the annotated transcript;
receive, from the user device, input data representing a user selection to cause presentation of additional information associated with the first topic;
generate knowledge results related to the first topic, wherein the knowledge results are different than the annotated transcript; and
send, to the user device, the knowledge results.

2. The system of claim 1, the context information comprising at least one of identification of a particular meeting participant, meeting agenda, meeting subject matter, meeting date, meeting time, or meeting location.

3. The system of claim 1, wherein the one or more hardware processors further execute the computer-executable instructions to generate the knowledge results by:
obtaining excerpts of information related to the first topic from a plurality of information sources; and
organizing the excerpts into at least one of a summary, digest or list.

4. The system of claim 1, wherein the first physical data store and the second physical data store are portions of the same physical data store.

5. A computer-implemented method comprising:
under control of one or more computing devices configured with specific computer-executable instructions,
receiving an electronic transcript of a conversation of spoken dialogue involving two or more participants, the electronic transcript comprising a plurality of words;
determining an attribute of the electronic transcript from at least some of the plurality of words;
searching, using the attribute, a collection of topics stored in an electronic data store to identify a first topic and a second topic relevant to the conversation;
generating, from the electronic transcript, an annotated electronic transcript comprising a first embedded indication of the first topic and a second embedded indication the second topic, wherein the first embedded indication is configured for presentation as a textual representation of the first topic to indicate availability of electronically stored data about the first topic, the textual representation different from a visual representation of another portion of the annotated electronic transcript;
sending the annotated electronic transcript to a computing device associated with a participant of the conversation;
receiving, from the computing device, input data representing a user selection to cause presentation of additional information associated with the first topic; and
sending a portion of the electronically stored data about the first topic, to the computing device, wherein the portion of the electronically stored data is different from the annotated electronic transcript and represents a portion of shared knowledge.

6. The computer-implemented method of claim 5, the electronic transcript being generated at least in part by automatic speech recognition.

7. The computer-implemented method of claim 5, the electronic transcript comprising text input received from the computing device associated with the participant of the conversation.

8. The computer-implemented method of claim 5, the attribute comprising context information associated with the conversation.

9. The computer-implemented method of claim 8, the context information comprising at least one of identification of a meeting participant, meeting agenda, meeting subject matter, meeting date, meeting time, or meeting location.

10. The computer-implemented method of claim 5, wherein sending the portion of the electronically stored data about the first topic comprises:
retrieving the electronically stored data from the electronic data store;
generating a summary of the electronically stored data, wherein the summary is different than the annotated electronic transcript; and
sending the summary of the electronically stored data to the computing device associated with the participant of the conversation.

11. The computer-implemented method of claim 5, wherein identifying at least the first topic further comprises:
retrieving context information associated with the conversation; and
determining that the participant of the conversation is likely interested in the first topic based at least in part on the context information associated with the conversation.

12. The computer-implemented method of claim 5, wherein identifying at least the first topic further comprises:
estimating a level of relevance of the first topic for the participant; and
determining that the level of relevance satisfies a threshold.

13. The computer-implemented method of claim 5, wherein determining the attribute of the electronic transcript comprises looking up an attribute corresponding to a word of the electronic transcript.

14. A non-transitory computer-readable medium comprising instructions executable by one or more processors to at least:
receive at least a portion of a transcript from a conversation of spoken dialogue involving two or more participants;
receive metadata associated with the conversation, the metadata comprising at least one topic or keyword;
search, using the metadata, a collection of topics stored in an electronic data store to identify a first topic and a second topic relevant to the conversation;
generate an annotated portion of the transcript comprising a first embedded indication of the first topic and a second embedded indication of the second topic, wherein the first embedded indication is configured for presentation as a textual representation of the first topic to indicate availability of electronically stored data about the first topic, the textual representation different from a visual representation of another portion of the transcript;
send, while the conversation is in process, the annotated portion of the transcript to a computing device associated with a participant of the conversation;
receive, from the computing device, input data representing a user selection to cause presentation of additional information associated with the first topic; and
send, while the conversation is in process, a portion of the electronically stored data about the first topic, to the computing device, wherein the portion of the electronically stored data is different from the annotated portion of the transcript and represents a portion of shared knowledge.

15. The non-transitory computer-readable medium of claim 14, the portion of the transcript being generated at least in part by automatic speech recognition.

16. The non-transitory computer-readable medium of claim 14, the portion of the transcript comprising text input received from the computing device associated with the participant of the conversation.

17. The non-transitory computer-readable medium of claim 14, wherein:
  searching the collection of topics identifies multiple topics relevant to the conversation; and
  the non-transitory computer-readable medium further comprises instructions executable by one or more hardware processors to at least filter, using context information associated with the conversation, the multiple topics to identify at least the first topic.

18. The non-transitory computer-readable medium of claim 14, wherein sending the portion of the electronically stored data about the first topic comprises:
  retrieving the electronically stored data from the electronic data store;
  generating a summary of the electronically stored data, wherein the summary is different than the annotated portion of the transcript; and
  sending the summary of the electronically stored data to the computing device associated with the participant of the conversation.

19. The non-transitory computer-readable medium of claim 14, wherein identifying at least the first topic further comprises:
  estimating a level of relevance of the first topic for the participant; and
  determining that the level of relevance satisfies a threshold.

* * * * *